US008730698B2

(12) United States Patent
Duerbaum et al.

(10) Patent No.: US 8,730,698 B2
(45) Date of Patent: May 20, 2014

(54) BOUNDARY CONDUCTION MODE CONTROLLER FOR A POWER CONVERSION CIRCUIT

(75) Inventors: Thomas Antonius Duerbaum, Baiersdorf (DE); Johann Baptist Daniel Kuebrich, Schlüsselfeld (DE); Hans Halberstadt, Groesbeek (NL); Frans Pansier, Nuenen (NL); Markus Schmid, Jettingen-Scheppach (DE)

(73) Assignee: NXP B.V., Eindhoven (NL)

( * ) Notice: Subject to any disclaimer, the term of this patent is extended or adjusted under 35 U.S.C. 154(b) by 333 days.

(21) Appl. No.: 12/981,238

(22) Filed: Dec. 29, 2010

(65) Prior Publication Data

US 2011/0261599 A1  Oct. 27, 2011

(30) Foreign Application Priority Data

Dec. 31, 2009  (EP) .................................... 09252936

(51) Int. Cl.
H02M 1/42 (2007.01)
H02M 7/04 (2006.01)

(52) U.S. Cl.
USPC ............................................ 363/89; 323/207

(58) Field of Classification Search
CPC ............................ H02M 1/4225; G05F 1/70
USPC ............ 323/222, 223, 282, 284, 207; 363/89, 363/84
See application file for complete search history.

(56) References Cited

U.S. PATENT DOCUMENTS

| | | | |
|---|---|---|---|
| 5,264,782 A | 11/1993 | Newton | |
| 5,751,139 A | 5/1998 | Jordan et al. | |
| 5,905,369 A | 5/1999 | Ishii et al. | |
| 6,191,565 B1 | 2/2001 | Lee et al. | |
| 6,469,917 B1 | 10/2002 | Ben-Yaakov | |
| 7,279,876 B2 * | 10/2007 | Adragna et al. | 323/284 |
| 7,692,417 B2 | 4/2010 | Dagher | |
| 8,111,050 B2 * | 2/2012 | Sutardja et al. | 323/207 |
| 2004/0263140 A1 | 12/2004 | Adragna et al. | |
| 2006/0044854 A1 | 3/2006 | Bocchiola et al. | |
| 2007/0063682 A1 | 3/2007 | Dagher | |
| 2007/0063683 A1 | 3/2007 | Coq et al. | |
| 2007/0210772 A1 * | 9/2007 | Sawtell | 323/282 |

FOREIGN PATENT DOCUMENTS

| | | |
|---|---|---|
| WO | 2005/101638 A1 | 10/2005 |
| WO | 2009/060098 A2 | 5/2009 |
| WO | 2009/120695 A1 | 10/2009 |

OTHER PUBLICATIONS

Datasheet, "FSQ510, FSQ510H Green Mode Fairchild Power Switch for Valley Switching Converter," Fairchild Semiconductor Corp. ,May 2007.*
Wang et al., A Dual-Mode Controller for the Boost PFC Controller, IEEE Transactions on Industrial Electronics, vol. 58, No. 1, Jan. 2011, p. 369-372.*

(Continued)

Primary Examiner — Adolf Berhane
Assistant Examiner — Jye-June Lee

(57) ABSTRACT

A power conversion controller for controlling the operation of a switch in a power conversion circuit, wherein the power conversion controller is configured to operate the switch according to: a variable frequency mode of operation for switching frequencies greater than a minimum threshold value; and a fixed frequency mode of operation at a switching frequency equal to the minimum threshold value.

10 Claims, 4 Drawing Sheets

(56) References Cited

OTHER PUBLICATIONS

Texas Instruments, SLUS515F Transition Mode PFC Controller UCC28050, UCC28051, UCC38050, UCC38051, Texas Instruments Inc., Mar. 2009.*

L6566A (Datasheet, "Multi-mode controller for SMPS with PFC front-end," STMicroelectronics, May 2008).*

Datasheet, "FSQ510, FSQ510H Green Mode Fairchild Power Switch for Valley Switching Converter," Fairchild Semiconductor Corp., May 2007.*

Extended European Search Report for European Patent Appln. No. 09252936.1 (Jul. 21, 2010).

System General Corp. "AN6961 Design and Apply to Power Factor Correction Circuit Using SG6961." Application Note. Dec. 2, 2012. pp. 19.

System General Corp. "SG6961 Power Factor Controller." Product Specification. Sep. 7, 2007. pp. 1-14.

* cited by examiner (Prior Art)

BOUNDARY CONDUCTION MODE CONTROLLER FOR A POWER CONVERSION CIRCUIT

This application claims the priority under 35 U.S.C. §119 of European patent application no. 09252936.1, filed on Dec. 31, 2009, the contents of which are incorporated by reference herein.

FIELD OF THE INVENTION

This invention relates to a controller for a power conversion circuit, and particularly, although not exclusively, a controller for the operation of a switch in a power factor correction circuit.

BACKGROUND

It is known that the harmonic content of input currents of mains-operated electrical equipment is limited by regulations such as EN 61000-3-2. The regulation is valid in a number of countries, and other countries are known to have regulations that restrict a power factor to a minimum level. Nonetheless, there is a need for improving the power factor.

Known ways to improve a power factor include using passive means such as a choke/inductor in series, whereby the choke has a high enough inductance to suppress current harmonics to below the regulation limit. It is also known in the art to use active means to improve the power factor. As regulations become stricter, the active solution is often considered preferable to the passive solution due to the improved effectiveness in improving mains harmonic contents.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

According to a first aspect of the invention, there is provided a power conversion controller for controlling the operation of a switch in a power conversion circuit, wherein the power conversion controller is configured to operate the switch according to:
 a variable frequency mode of operation for switching frequencies greater than a minimum threshold value; and
 a fixed frequency mode of operation at a switching frequency equal to the minimum threshold value.

In this way, an efficient power conversion circuit can be provided that can take advantage of favourable performance of different modes of operation in accordance with how the power conversion circuit is being used. For example, the power conversion circuit can be operated in a mode of operation in accordance with an output power level of the power conversion circuit such that a variable frequency mode of operation is used for low power levels and a fixed frequency mode of operation is used for high power levels.

The fixed frequency mode of operation may be a continuous conduction mode (CCM) of operation. The variable frequency mode of operation may be a boundary conduction mode (BCM) of operation. It has been found that use of a combination of CCM and BCM can provide a particularly effective power conversion circuit.

The power conversion circuit may be a power factor correction circuit.

The power conversion controller may be configured to change from the fixed frequency mode of operation to the variable frequency mode of operation seamlessly when the required output and input powers drop such that a variable frequency mode of operation can be performed at a switching frequency that is in excess of the minimum threshold value.

The power conversion controller may be configured to change from the variable frequency mode of operation to the fixed frequency mode of operation seamlessly when the actual switching frequency in the variable frequency mode of operation (such as BCM) reaches the minimum threshold value for the switching frequency level.

The power conversion controller may be configured to change the mode of operation during a half wave of a signal received at the power conversion circuit. Providing a power conversion controller that can set a mode of operation at a high enough frequency to be able to change the mode of operation during a half wave of a signal (such as a mains signal, or rectified mains signal) received at the power conversion circuit can provide a particularly efficient power conversion circuit.

According to a further aspect of the invention, there is provided a power conversion circuit comprising:
 a switch; and
 a controller for controlling the operation of a switch, the controller configured to operate the switch according to:
  a variable frequency mode of operation for switching frequencies greater than a minimum threshold value; and
  a fixed frequency mode of operation at a switching frequency equal to the minimum threshold value.

The power conversion circuit may comprise a power factor correction circuit. The power factor correction circuit may be a boost converter, a buck converter, a buck-boost converter or any other type of switching-mode power supply (SMPS) circuit. It will be appreciated that embodiments of the invention can be used with any pulse width modulation (PWM) controlled converter. Further examples include Cuk converters, single ended primary inductor (SEPIC) converters, flyback converters, forward converters and half bridge converters.

According to a further aspect of the invention, there is provided a method of controlling the operation of a switch in a power conversion circuit, the method comprising operating the switch according to:
 a variable frequency mode of operation for switching frequencies greater than a minimum threshold value; and
 a fixed frequency mode of operation at a switching frequency equal to the minimum threshold value.

There may be provided an integrated circuit comprising the control functionality of any power factor correction controller or circuit disclosed herein.

There may be provided a computer program, which when run on a computer, causes the computer to configure any apparatus, including a power conversion controller, circuit, system, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

A computer program, which when run on a computer, causes the computer to perform any method disclosed herein, or configure any controller disclosed herein, or configure any circuit disclosed herein.

BRIEF DESCRIPTION OF DRAWINGS

A description is now given, by way of example only, with reference to the accompanying drawings, in which.

DETAILED DESCRIPTION

One or more embodiments described herein can relate to a controller for a power conversion circuit, and in particular, a controller for controlling a switch in the power conversion circuit. The controller may comprise a minimum threshold value that corresponds to a minimum switching frequency level of the switch The controller can operate the switch in either a fixed frequency mode of operation at the minimum switching frequency level or in a variable frequency mode of operation at switching frequencies that are greater than the minimum switching frequency level.

As an example, the controller can operate the switch in a continuous conduction mode (CCM) fixed frequency mode of operation when a high power is required at the output of the power conversion circuit, and the controller can operate the switch in a boundary conduction mode (BCM) variable frequency mode of operation for low powers. Such an example can provide an efficient power conversion circuit by taking advantage of the improved performance of the different modes of operation in accordance with the instantaneous power requirements of the power conversion circuit.

In some embodiments, the mode of operation of the switch can be changed during a period of time represented by a half-wave signal received at the input of the power conversion circuit.

Figure 1:
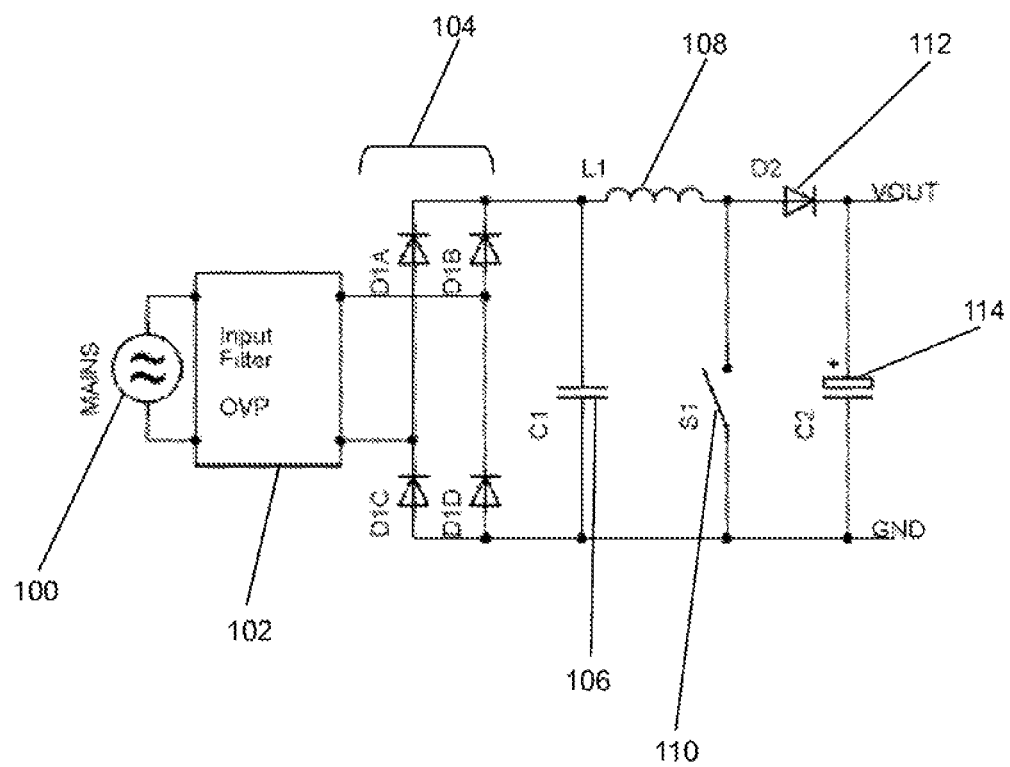
FIG. 1 illustrates a boost converter configured as power factor correction stage.

FIG. 1 illustrates a boost converter configured as power factor correction stage, which is a known way to improve the power factor of a circuit. The boost converter can operate at a high switching frequency in order to generate a sinusoidal input current waveform, or at least an input current waveform with a harmonic content that is low enough to fulfil any regulation, whilst still providing a higher output voltage for a secondary DC-DC converter (not shown), which in turn will feed a load.

The boost converter shown in FIG. 1 is connected to a mains voltage supply 100 via an appropriate input filter 102. The filter 102 should be used to filter out high frequency components of the PFC stage. However, the harmonic content of the EN 61000-3-2 regulation is not affected by the filter stage.

Connected to the outputs of the input filter 102 is a bridge rectifier 104, which consists of four diodes DIA to DID. A filtering capacitor C1 106 is connected across the outputs of the bridge rectifier 104. The value of the filtering capacitor 106 is limited by the amount of zero crossing distortions limiting the power factor, and it can prevent excessively high frequency current from flowing through the rectifier diodes.

The boost converter is provided by a choke/inductor L1 108, a switch S1 110, which is often a metal oxide semiconductor field effect transistor (MOSFET) or an insulated-gate bipolar transistor (IGBT), and a rectifier diode D2 112.

An output capacitor C2 114 is connected across the outputs of the boost converter in order to buffer the energy resulting from the fluctuating power input. The voltage across the output capacitor 114 is provided as an input voltage to a secondary stage such as a DC-DC converter (not shown), and the voltage across the output capacitor 114 can be higher than the mains peak voltage. No recharge pulses can occur in this configuration.

It is known to operate a boost converter in one of a number of different operational modes. One of these modes is a fixed switching frequency mode, in which case the input current waveform is controlled to be sinusoidal, or to follow the input voltage. Using a fixed switching frequency, the converter can operate in discontinuous conduction mode (DCM) or in continuous conduction mode (CCM) depending on the actual power transfer, the voltage levels, the switching frequency, and the inductance of the choke.

As is known in the art, CCM is defined as a state of operation whereby the current through the choke L1 108 does not fall to zero between successive switching operations, and therefore the choke L1 108 is continuously conducting. DCM is defined as an operating mode whereby the current through the choke L1 108 does drop to zero between successive switching cycles, and therefore the choke L1 108 does not continuously conduct.

Figure 2:
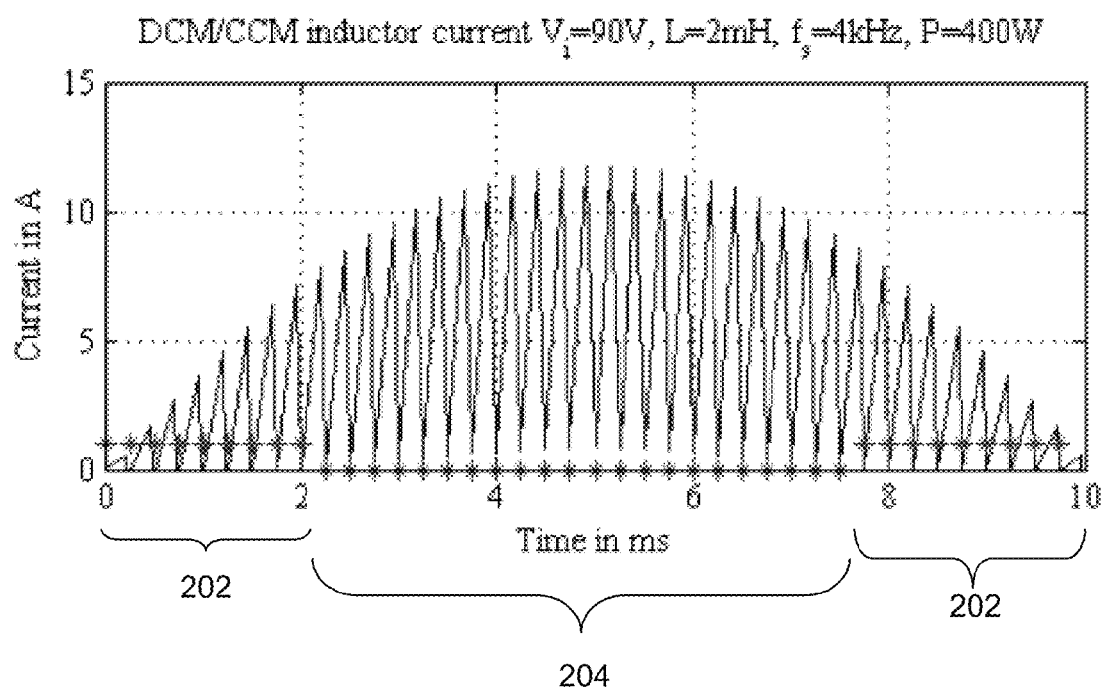
FIG. 2 illustrates graphically operation of a boost converter in a fixed frequency mode of operation.

FIG. 2 illustrates graphically operation of a boost converter in a fixed frequency mode of operation, whereby the instantaneous mode of operation can be DCM or CCM depending upon the power transfer. FIG. 2 illustrates the current flowing through the choke L1 108 during a half wave signal received from the bridge rectifier 102.

It can be seen that for low power transfer around the zero crossing of the mains signal, the boost converter operates in DCM, and this is indicated in FIG. 2 with reference 202. For a higher power transfer, the converter operates in CCM, and this is illustrated in FIG. 2 with reference 204. It will be appreciated that for "part-load", the converter may operate in DCM for the entire half-wave signal.

Figure 3:
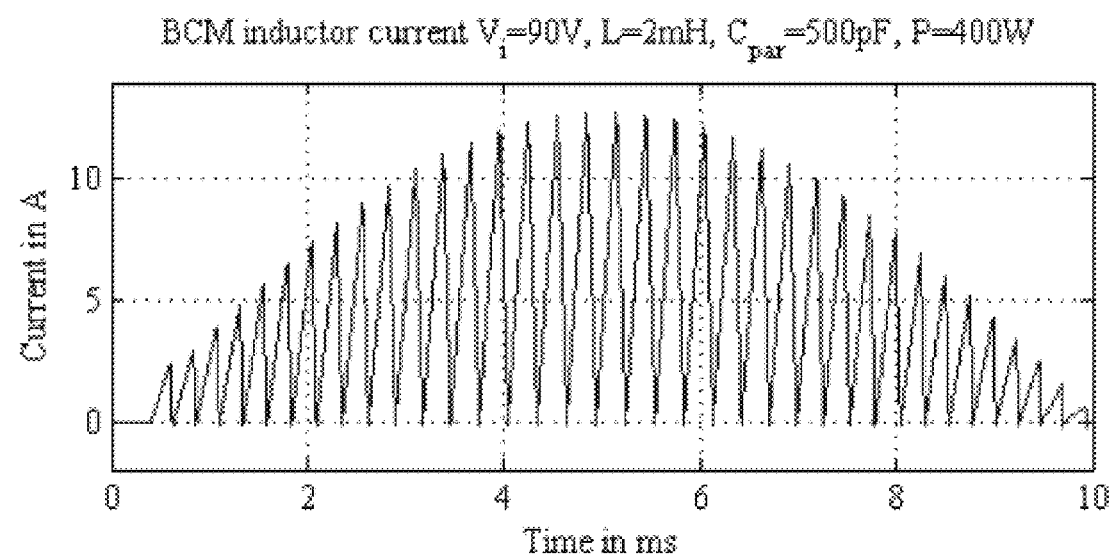
FIG. 3 illustrates graphically operation of a boost converter in a variable frequency mode of operation.

FIG. 3 illustrates graphically operation of a boost converter under a variable switching frequency mode of operation. This can result directly if the converter is operated with a fixed hysteretic of the inductor current, or if the PFC boost converter happens to be operated at a border between DCM and CCM mode. The mode of operation that is illustrated in FIG. 3 is a boundary conduction mode (BCM) operation, as the switching frequency is varied such that the inductor current just returns to zero before increasing again at the start of a new switching cycle.

Figure 4:
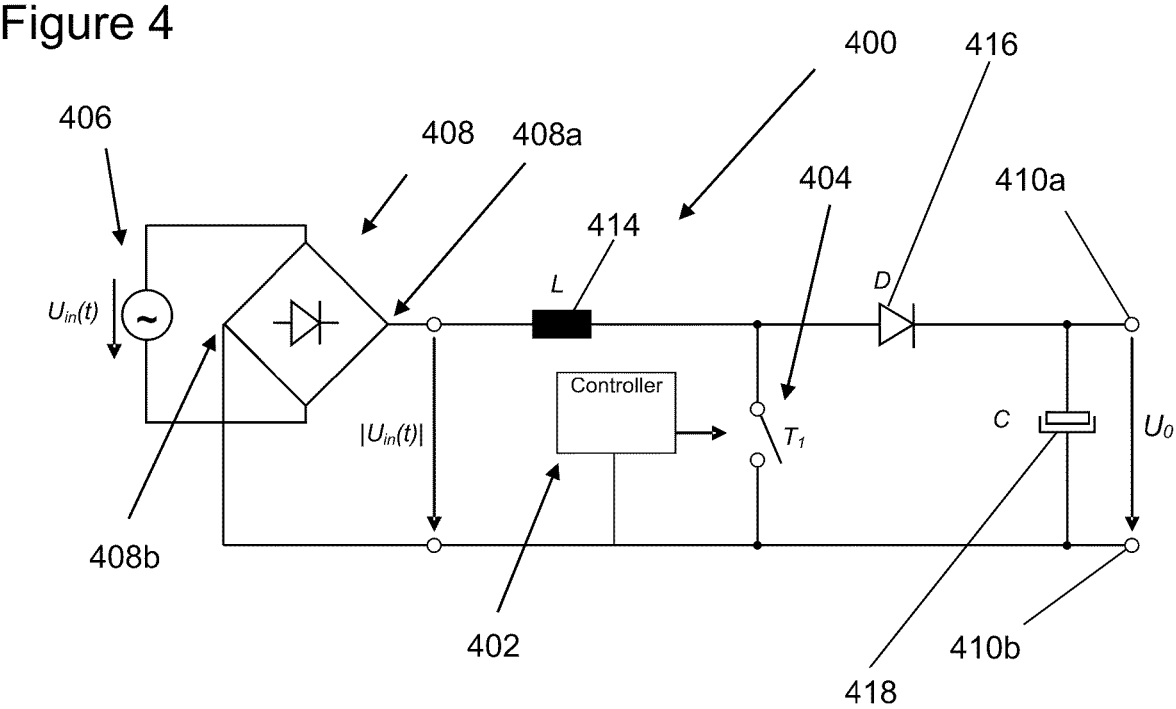
FIG. 4 illustrates a circuit according to an embodiment of the invention.

FIG. 4 illustrates an example of a circuit 400 according to an embodiment of the invention. The circuit 400 comprises an alternating input voltage source 406, such as a main supply, that is connected to a bridge rectifier circuit 408. The DC voltage provided as an output of the bridge rectifier circuit 408 is illustrated in FIG. 4 as $|U_{in}(t)|$. A first DC voltage output 408a of the bridge rectifier circuit 408 is connected to a first pin of an inductor/choke L 414, and the second pin of the inductor L 414 is connected to the first pin of a diode D 416. The second pin of the diode D 416 is connected to a first output port 410a and also a first plate of a capacitor C 418.

A second DC voltage output 408b of the bridge rectifier circuit 408 is connected to a second plate of the capacitor C 418, and also a second output port 410b.

In addition, a switch $T_1$ 404 is provided between the second DC voltage output 408b of the bridge rectifier 408 and the connection between the second pin of the inductor L 414 and the first pin of the diode D 416. As will be described in more detail, the state of the switch 404, and mode of operation of the boost converter, is controlled by a controller 402.

It has been appreciated that operation of the switch 404 in CCM, as opposed to BCM, can be beneficial as the root mean squared (RMS) currents in the MOSFET switch 404, and the excitation of the inductor 414, can be reduced. CCM operation has been found to be preferable for high loads, and this can include a reduction in losses at turn-off of the MOSFET switch 404.

It has also been appreciated that BCM operation can be beneficial for low to mid power as there can be no, or reduced, losses due to the reverse recovery of the rectifier diode 416. Turn-on losses can also be reduced further by using BCM with valley switching.

BCM with valley skipping/switching may be considered as a practical implementation of ideal BCM. Ideal BCM can require the current to drop to zero at the end of the switching cycle and remains zero, however, in practice this does not occur as an oscillating inductor current will be present in the circuit as capacitors and other components, together with the boost choke, provide an oscillating circuit. BCM with valley switching comprises waiting for the diode current to fall to zero, and then further waiting for the next minimum, or at least a low enough value, in the oscillating voltage across the switch before operating the switch. The minimum value in the oscillating voltage may be referred to as a "valley". BCM with valley skipping involves skipping a number of "valleys" before operating the switch, so that the switch is operated under the occurrence of a second or later valley.

In some examples, a comparison between BCM and CCM operation can show that higher losses are expected with BCM due to the higher current at turn-off of the switch 404. However, these losses can be reduced by application of a snubber capacitor across the drain and source of the MOSFET switch 404 if valley switching is also implemented. The use of this capacitor may not be appropriate for CCM operation due to a rise in turn-on losses.

The controller 402 may be capable of operating the boost converter in CCM at a predefined, usually fixed, frequency and change the control strategy towards BCM when necessary.

In this example, the controller 402 monitors the switching frequency of the switch 404 operating in a variable frequency mode of operation, and as the switching frequency decreases as the required power increases, the controller 402 can detect when the variable switching frequency reaches a minimum frequency threshold value. The controller 402 can then change the mode of operation of the switch 404 to a fixed frequency mode of operation (such as CCM) when the minimum frequency threshold is reached, thereby fixing the frequency at the minimum frequency threshold. That is, the controller 402 prevents the switching frequency from falling below the minimum frequency threshold, and this can cause the converter to operate in a CCM mode of operation for power levels that would otherwise require a smaller switching frequency if operating under BCM.

Figure 5:
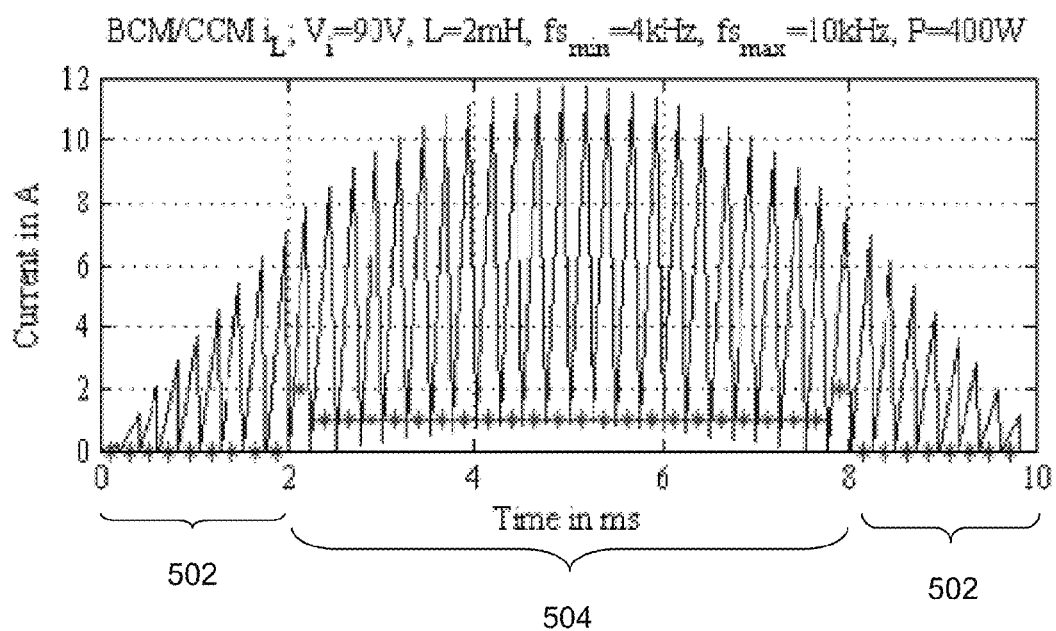
FIG. 5 illustrates graphically operation of a boost converter according to an embodiment of the invention.

FIG. 5 illustrates graphically performance of a converter according to an embodiment of the invention. FIG. 5 illustrates the current through the inductor on the vertical axis, and time on the horizontal axis. In the same way as illustrated in FIGS. 2 and 3, the time that is illustrated on the horizontal axis represents a half-wave signal received from the mains supply.

It will be appreciated that FIGS. 2, 3 and 5 show simulation results for a design using parameters chosen so that the switching cycles can be seen separately. In real world applications, the inductance value is much smaller and the switching frequency levels are set much higher than the values used for the simulation. Nonetheless, the simulations used to produce the results shown in FIGS. 2, 3 and 5 are convenient for illustrating the principles of the invention.

As discussed above, it can be seen from FIG. 5 that the converter for the chosen parameters operates partly in a fixed frequency CCM mode and partly with BCM with variable frequency. The time span indicated by 504 is the time where the converter operates in fixed frequency CCM. The inductor current does not reach zero. The time intervals indicated with 502 is the portion of the mains half cycle where the converter operates in normal BCM mode. Due to the chosen output power a $2^{nd}$ BCM mode, operating with valley skipping, does not occur in FIG. 5.

One implementation of the controller 402 is to turn the switch 404 on after a distinct period of time, independent of the inductor current. This seamlessly results in CCM operation. The converter can then be considered as switching to CCM mode automatically, and known control principals for peak current mode control can be used in conjunction with this controller is shown in FIG. 6.

Figure 6:
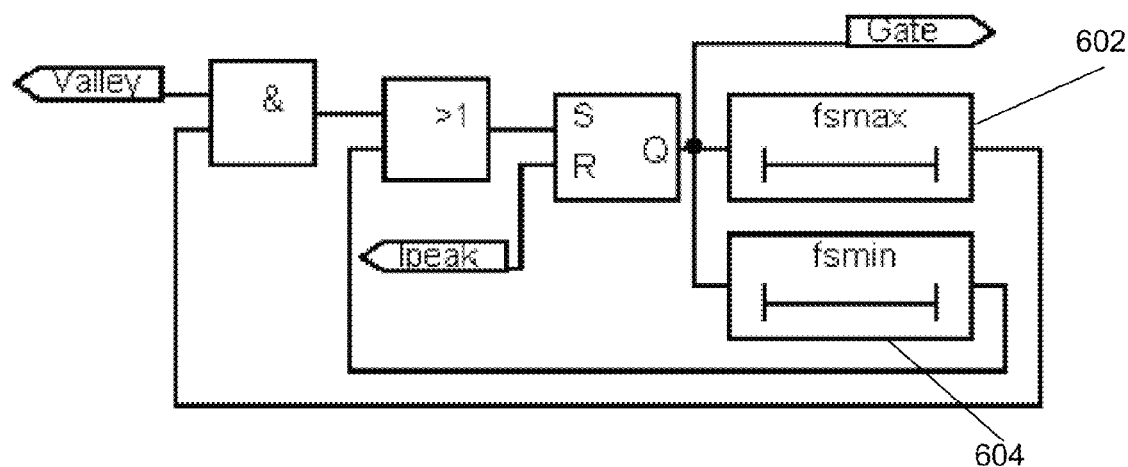
FIG. 6 illustrates schematically a controller according to an embodiment of the invention.

FIG. 6 depicts a simplified block diagram of the control scheme related to the current invention. The depicted control scheme allows on one hand the seamless transition between CCM and BCM operation due to the introduction of a minimum switching frequency (fsmin, 604). On the other hand it allows for a transition between two different BCM operation modes (BCM with valley switching only and BCM with additional valley skipping) by the introduction of a maximum switching frequency level fsmax (602). In order to avoid unwanted frequent changes between the two BCM operation modes a practical implementation of fsmax might incorporate a hysteresis (that is two slightly different fsmax values for adding or reducing the number of valleys skipped.)

In principal, BCM operation can be considered as superior to DCM operation for the following reasons:

Valley switching is possible with BCM, whereas in DCM the MOSFET can be switched on at any time, and therefore the capacitive turn-on losses are higher than in BCM mode of operation.

The peak current, and thus the turn-off losses, are expected to be higher in DCM operation. The fixed switching frequency can require a relatively long time without current between the pulses. The peak current may be higher as the same power must be transferred. A snubbing capacitor may not be appropriate because of capacitive turn-on losses.

The higher peak current can introduce higher core excitation for the inductor 414, and therefore the losses in the inductor 414 are expected to be higher than for BCM operation.

The RMS current in the MOSFET switch 404, as well as in the rectifier diode 416, is expected to be higher than for the BCM mode of operation, and therefore conduction losses are also subject to rise.

It will be appreciated that there are further reasons why BCM operation can be considered as better than DCM operation for a boost converter, and one or more embodiments disclosed herein are based on the appreciation that BCM operation is preferable to DCM operation at low power levels, and also that the disadvantages of BCM operation at higher power levels can be avoided by changing the mode of operation to CCM for the higher power levels.

In some embodiments, a converter may operate in BCM for all of the time during part load, as for the given operation point the switching frequency will stay in BCM operation above the chosen minimum frequency level.

Embodiments of the invention can improve the part load efficiency of a power supply/converter for existing PFC boost converters operating with fixed frequency, or can expand the feasible operation range of BCM boost converters to higher power levels.

It will be appreciated that principles of embodiments of the invention are not restricted to boost converters, nor power factor correction (PFC) stages, and can be equally applicable to any type of converter, including any pulse width modulated (PWM) converter. Embodiments of the invention can be especially advantageous for converters that typically feed a variable load from a wide range input voltage.

One or more of the embodiments described herein can enable a power factor correction circuit/stage to be able to work with BCM with valley skipping to increase efficiency even further, especially at relatively low load conditions. The controller can dynamically change from CCM to BCM to BCM with valley skipping in accordance with operational parameter values.

A PFC according to an embodiment of the invention may not need to measure current by means of a sensing resistor, and can shape the mains current in other ways to fulfil either legislative requirements/standards or a customers requirements with respect to harmonic contents of the mains current, for example by controlling a constant "time-on" property of the switch.

One or more embodiments of the invention can be used with a power supply, especially a power factor correction circuit that operates under BCM and only at the most critical operation points of maximum load and/or minimum input voltage in CCM.

One or more embodiments disclosed herein can limit a maximum ripple current by virtue of a minimum frequency setting. In some embodiments, an improved efficiency can be achieved by reducing the RMS value of the current and/or a reducing the size and losses associated with an input EMI filter associated with the power conversion circuit. This can be achieved by preventing too low a switching frequency.

The invention claimed is:

1. A power conversion controller for controlling the operation of a switch in a power conversion circuit, wherein the power conversion controller is configured to operate the switch according to:
   a variable frequency mode of operation for switching frequencies greater than a minimum threshold value, wherein the variable frequency mode of operation is a first boundary conduction mode of operation with valley switching only or a second boundary conduction mode of operation with valley switching and additional valley skipping, wherein the power conversion controller is configured to transit between the first boundary conduction mode of operation and the second boundary conduction mode of operation based on a maximum switching frequency; and
   a fixed frequency mode of operation at a switching frequency equal to the minimum threshold value, wherein the power conversion controller is configured to transit between the fixed frequency mode of operation and the variable frequency mode based on a minimum switching frequency, wherein the power conversion controller comprises:
   an AND logic module;
   an OR logic module connected to an output terminal of the AND logic module;
   a flipflop module connected to an output terminal of the OR logic module;
   a first signal generation module having the maximum switching frequency and connected to an output terminal of the flipflop module and an input terminal of the AND logic module; and
   a second signal generation module having the minimum switching frequency and connected to the output terminal of the flipflop module and an input terminal of the OR logic module.

2. The power conversion controller of claim 1, wherein the power conversion circuit is a power factor correction circuit.

3. The power conversion controller of claim 1, wherein the fixed frequency mode of operation is a continuous conduction mode of operation.

4. The power conversion controller of claim 1, wherein the power conversion controller is further configured to operate the switch according to a second variable frequency mode of operation in accordance with one or more detected operational parameter values.

5. The power conversion controller of claim 1, wherein the power conversion controller is configured to change a mode of operation during a half wave of a signal received at the power conversion circuit.

6. The power conversion controller of claim 1, wherein the power conversion controller is configured to skip at least one minimum value in an oscillating voltage across the switch before operating the switch such that the switch is operated under an occurrence of a second or later minimum value in the oscillating voltage.

7. The power conversion controller of claim 1, wherein the power conversion controller is configured to wait for a diode current in the power conversion circuit to fall to zero, and then further wait for a minimum value in an oscillating voltage across the switch before operating the switch.

8. A power conversion circuit comprising:
   a switch; and
   a controller for controlling the operation of the switch, the controller configured to operate the switch according to:
   a variable frequency mode of operation for switching frequencies greater than a minimum threshold value, wherein the variable frequency mode of operation is a first boundary conduction mode of operation with valley switching only or a second boundary conduction mode of operation with valley switching and additional valley skipping, wherein the controller is configured to transit between the first boundary conduction mode of operation and the second boundary conduction mode of operation based on a maximum switching frequency; and
   a fixed frequency mode of operation at a switching frequency equal to the minimum threshold value, wherein the controller is configured to transit between the fixed frequency mode of operation and the variable frequency mode based on a minimum switching frequency, wherein the controller comprises:
   an AND logic module;
   an OR logic module connected to an output terminal of the AND logic module;
   a flipflop module connected to an output terminal of the OR logic module;

a first signal generation module having the maximum switching frequency and connected to an output terminal of the flipflop module and an input terminal of the AND logic module; and a second signal generation module having the minimum switching frequency and connected to the output terminal of the flipflop module and an input terminal of the OR logic module.

9. The power conversion circuit of claim 8, wherein the power conversion circuit comprises a power factor correction circuit.

10. A method of controlling the operation of a switch in a power conversion circuit, the method comprising operating the switch according to:

a variable frequency mode of operation for switching frequencies greater than a minimum threshold value, wherein the variable frequency mode of operation is a first boundary conduction mode of operation with valley switching only or a second boundary conduction mode of operation with valley switching and additional valley skipping; and a fixed frequency mode of operation at a switching frequency equal to the minimum threshold value, the method comprising:

transiting between the first boundary conduction mode of operation and the second boundary conduction mode of operation based on a maximum switching frequency using a controller; and transiting between the fixed frequency mode of operation and the variable frequency mode based on a minimum switching frequency using the controller, wherein the controller comprises:

an AND logic module;

an OR logic module connected to an output terminal of the AND logic module;

a flipflop module connected to an output terminal of the OR logic module;

a first signal generation module having the maximum switching frequency and connected to an output terminal of the flipflop module and an input terminal of the AND logic module; and a second signal generation module having the minimum switching frequency and connected to the output terminal of the flipflop module and an input terminal of the OR logic module.

\* \* \* \* \*